United States Patent
Katsumoto et al.

(10) Patent No.: US 7,455,930 B2
(45) Date of Patent: Nov. 25, 2008

(54) BATTERY AND METHOD FOR MANUFACTURING THE SAME

(75) Inventors: Masumi Katsumoto, Chigasaki (JP);
Hideki Kasahara, Naka-gun (JP);
Masaharu Miyahisa, Fujisawa (JP);
Yoshihiro Boki, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 318 days.

(21) Appl. No.: 10/343,259

(22) PCT Filed: Jun. 15, 2001

(86) PCT No.: PCT/JP01/05160

§ 371 (c)(1),
(2), (4) Date: Feb. 18, 2003

(87) PCT Pub. No.: WO02/17412

PCT Pub. Date: Feb. 28, 2002

(65) Prior Publication Data

US 2003/0182792 A1    Oct. 2, 2003

(30) Foreign Application Priority Data

Aug. 22, 2000 (JP) .............................. 2000-250650
Jan. 17, 2001 (JP) ................................. 2001-9210

(51) Int. Cl.
*H01M 10/04* (2006.01)

(52) U.S. Cl. ....................................... 429/176; 429/164

(58) Field of Classification Search ................. 429/163, 429/164, 165, 166, 167, 175, 176, 131, 133, 429/149, 157, 159; 29/623.1, 623.2, 730
See application file for complete search history.

(56) References Cited

U.S. PATENT DOCUMENTS

| 5,731,098 | A | 3/1998 | Suzuki |
| 6,045,944 | A * | 4/2000 | Okada et al. ................. 429/163 |
| 6,081,992 | A | 7/2000 | Kelemen et al. |
| 6,333,124 | B1 * | 12/2001 | Moriwaki et al. ............. 429/176 |
| 6,579,640 | B1 * | 6/2003 | Nagase et al. ................. 429/54 |
| 2001/0000238 | A1 * | 4/2001 | Urry ........................... 429/164 |

FOREIGN PATENT DOCUMENTS

| GB | 734863 | 8/1955 |
| JP | 60-56376 | 4/1985 |
| JP | 63-221553 | 9/1988 |
| JP | 63-221554 | 9/1988 |
| JP | 64-71056 | 3/1989 |
| WO | 99/19918 | 4/1999 |
| WO | 01/78181 | 10/2001 |
| WO | 02/03484 | 1/2002 |

* cited by examiner

*Primary Examiner*—Patrick Ryan
*Assistant Examiner*—Monique Wills
(74) *Attorney, Agent, or Firm*—Jordan and Hamburg LLP

(57) ABSTRACT

A battery having a coiled electrode plate assembly housed in a case that efficiently utilizes the space available in portable electronic appliances is provided. The battery case 1 has a head portion 1a having a circular cross section and a body portion 1b having a substantially square cross section, one side of which is equal to or longer than the diameter of the circular cross section of the head portion.

6 Claims, 6 Drawing Sheets

BATTERY AND METHOD FOR MANUFACTURING THE SAME

FIELD OF THE INVENTION

The present invention relates to the field of batteries for portable devices.

BACKGROUND ART

Rechargeable batteries such as nickel metal hydride rechargeable batteries and lithium-based rechargeable batteries are widely used as power sources for portable devices such as portable telephones, notebook type personal computers, video cameras, and the like. Nowadays, further miniaturization been eagerly sought in such electronic appliances. In order to minimize the volume occupied by batteries in the devices, the batteries should be in a prismatic shape from the viewpoint of efficient use of available space. However, while offering excellent space efficiency, a prismatic battery has the following disadvantages as compared to a cylindrical battery.

FIG. 5 is a partially cutaway perspective view showing a commonly-used prismatic alkaline rechargeable battery, and FIG. 6 is a semi diagrammatical, partially sectional perspective view showing a commonly-used cylindrical alkaline rechargeable battery.

In the cylindrical battery, elements for electromotive force are constructed by winding a sheet of positive electrode 7 and a sheet of negative electrode 9 with an intervening separator 8 therebetween into a coil, as shown in FIG. 6. In contrast, the elements for electromotive force for the prismatic battery include a plurality of positive electrode plates 7 and a plurality of negative electrode plates 9 stacked upon one another with a plurality of intervening separators therebetween as shown in FIG. 5. Thus the fabrication of the prismatic battery involves far more complicated process steps, resulting in low productivity.

In particular, the separators 8 for the prismatic battery are formed in a bag shape for enveloping one of the positive and negative electrode plates so as to prevent short-circuiting, further causing the manufacturing process to be complicated.

Moreover, it is generally difficult to provide a completely airtight seal between the case 1 and the sealing plate 3 at the open end of the prismatic battery case, leading to another disadvantage that the battery has poorer leakage proof characteristics. A commonly known method of sealing a prismatic battery involves welding the abutment line between the open end edge of the case 1 and the sealing plate 3 by a laser beam. The method inherently requires high cost as it uses laser and is not necessarily promising in terms of reliability because of the difficulty in controlling laser power output to ensure stable welding.

Thus both the prismatic battery and the cylindrical battery have their respective merits and demerits, and a trade-off is desirable between the space utility efficiency of the prismatic battery and its inferiority in producibility and reliability as compared to the cylindrical battery.

DISCLOSURE OF THE INVENTION

The present invention has been made to solve the above problems, and it is an object of the invention to provide a battery which is suitable for use in small portable devices, and is excellent in producibility, reliability, and space efficiency.

A battery according to the present invention includes a metal case having an open end, and an electrode plate assembly housed in the metal case, the open end of the metal case being airtightly sealed with a sealing plate, wherein the metal case includes a head portion having a circular cross section and a body portion having a substantially square cross section, one side of the square cross section of the body portion having a length equal to or larger than the diameter of the circular cross section of the head portion.

Methods of manufacturing batteries, including a metal case having an open end, an electrode plate assembly housed in the metal case, and a sealing plate for sealing the open end of the metal case, according to the invention may include the steps of:

housing the electrode plate assembly into a cylindrical case having an open end and a cross-sectional diameter larger than that of the sealing plate;

reducing the diameter of the cylindrical case in a top end portion including the open end thereof so as to coincide with the diameter of the sealing plate;

sealing the open end of the cylindrical case with the sealing plate by caulking; and processing the cylindrical case so as to have a body portion having a substantially square cross section.

These and other objects and characteristics of the present invention will become further clear from the following description with reference to the accompanying drawings.

BEST MODE FOR CARRYING OUT THE INVENTION

Preferred embodiment of the present invention will be hereinafter described with reference to the accompanying drawings. In the following description, the term "battery" should be interpreted as high rate batteries of any kind, particularly rechargeable batteries including nickel metal hydride batteries, nickel-cadmium batteries, and lithium-based batteries.

By way of example, the preferred embodiment below will be described as a nickel metal hydride battery, which uses nickel-based material for the positive electrode and hydrogen-absorption alloy for the negative electrode.

Figure 1:
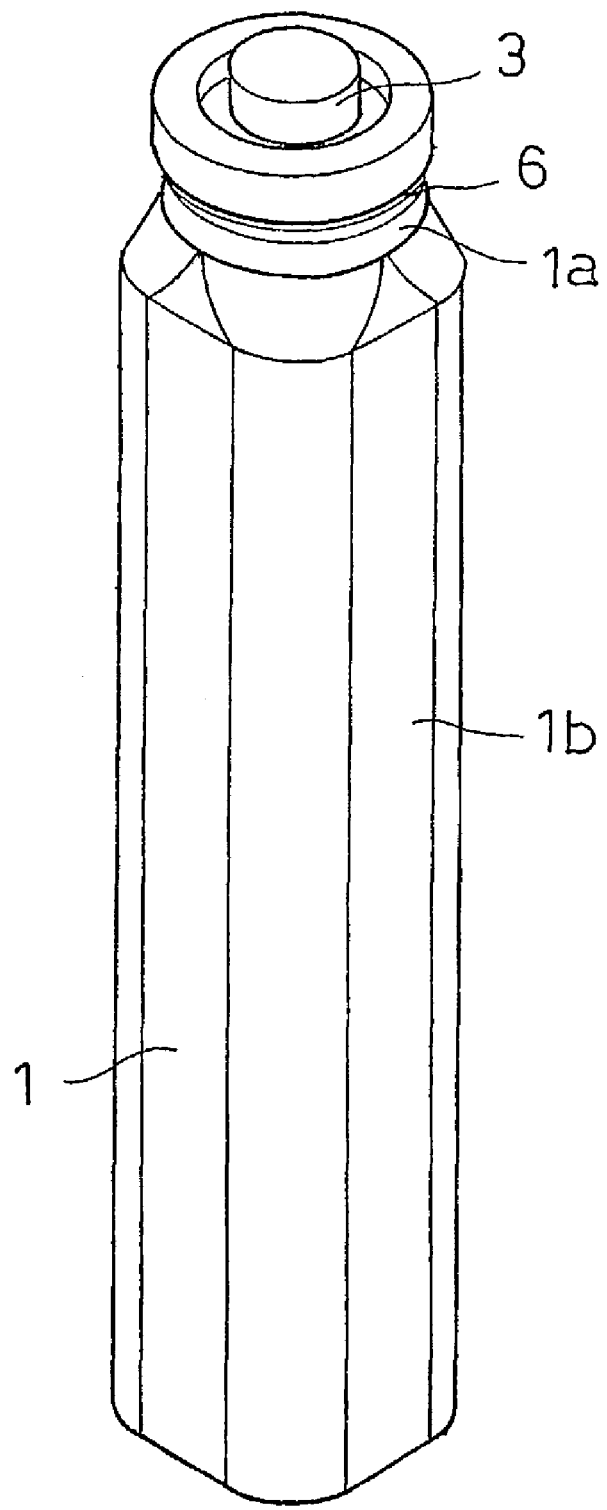
FIG. 1 is a perspective view of a battery according to one embodiment of the present invention.
Figures 2A, 2B, 2C:
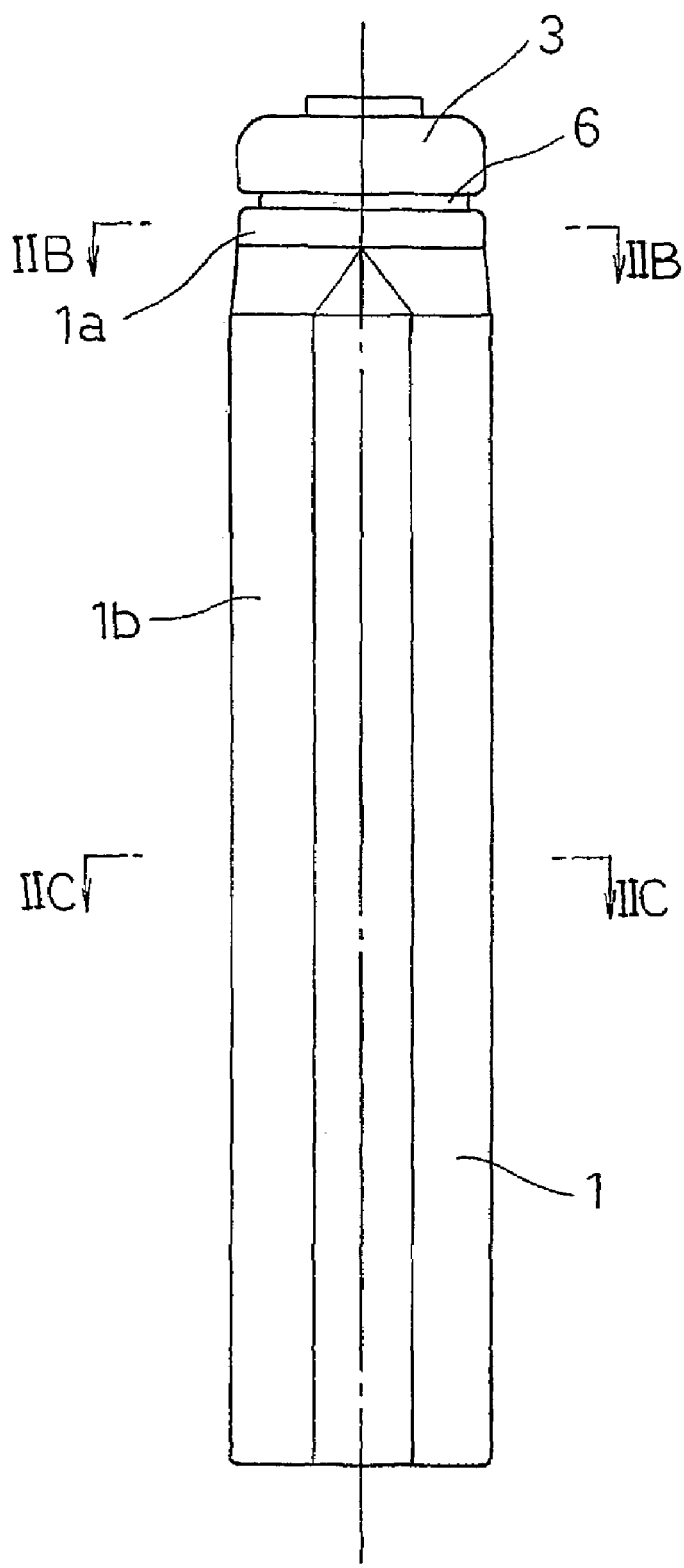
FIG. 2A is a front view of the battery.
FIG. 2B is a sectional view of the battery taken in the direction of arrow IIB-IIB of FIG. 2A.
FIG. 2C is a sectional view of the battery taken in the direction of arrow IIC-IIC of FIG. 2A.

FIG. 1 is a perspective view of a battery according to the present invention. FIG. 2A is a front view, and 2B and 2C are sectional views thereof. In FIGS. 2B and 2C, elements for electromotive force and other structural members are omitted for ease of illustration.

Figure 3:
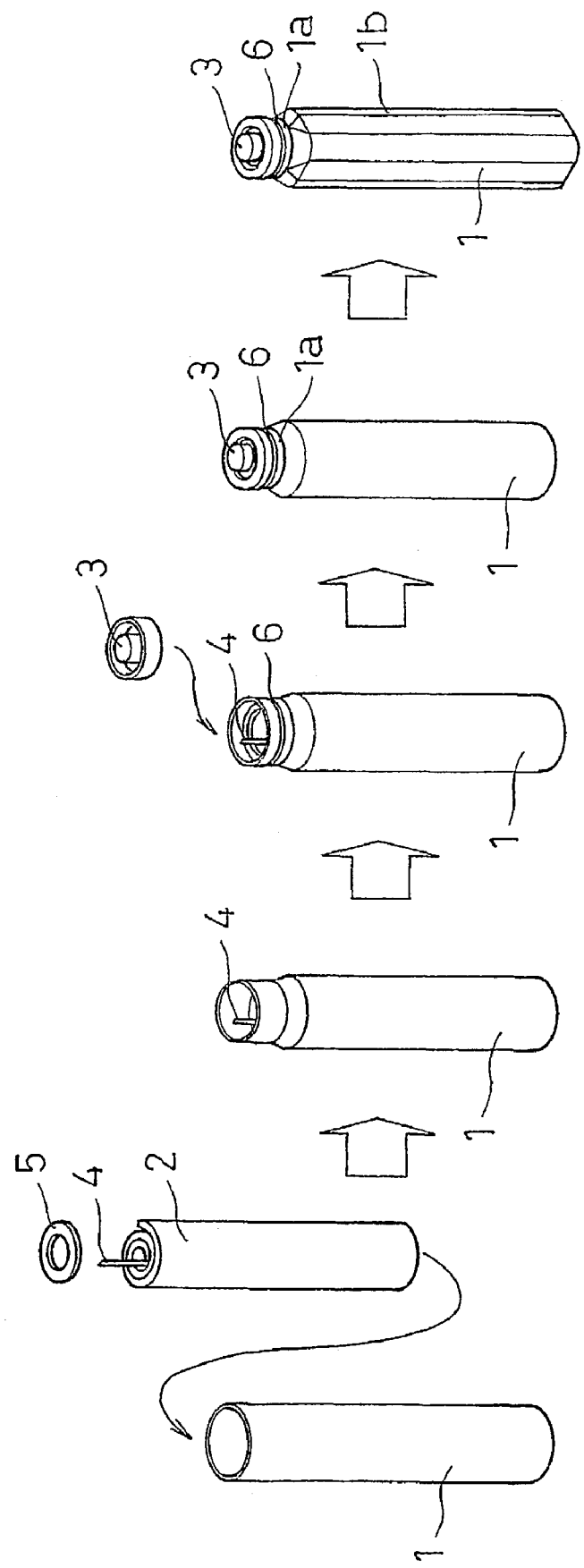
FIG. 3 is a process diagram schematically showing the method for manufacturing a battery according to the present invention.
Figure 4A:
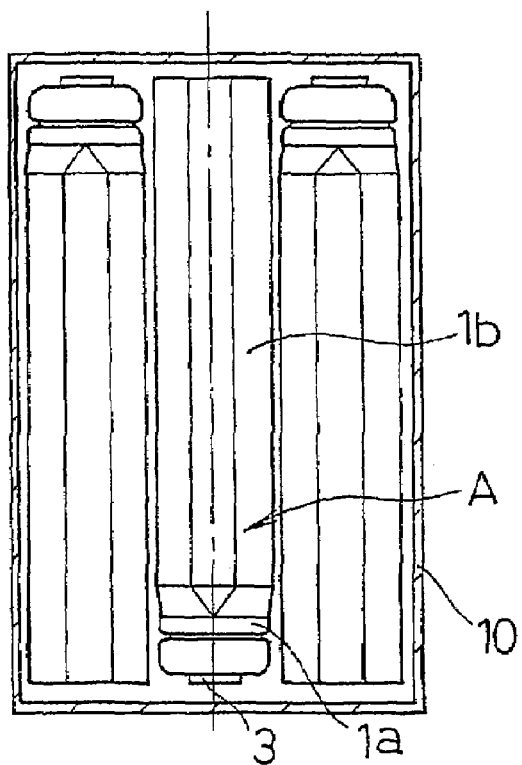
FIG. 4A is a plan view of a battery pack case wherein the batteries according to the invention are housed.
Figure 4C:
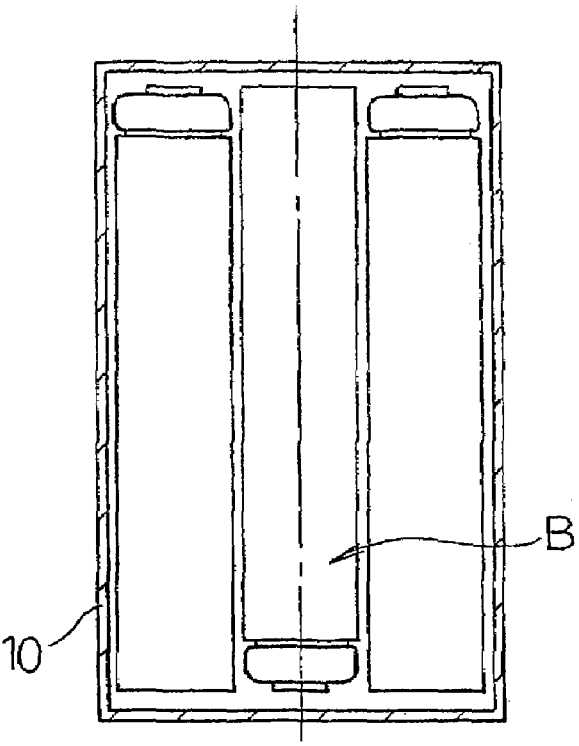
FIG. 4C is a plan view showing a battery pack case in which conventional cylindrical batteries as comparative examples are housed.
Figure 4B:
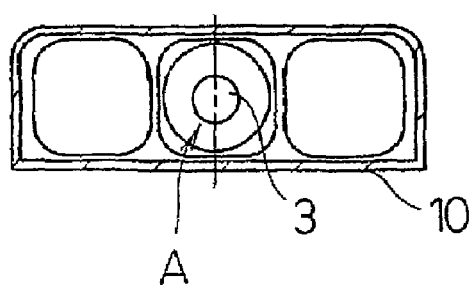
FIG. 4B is a sectional view of the same.
Figure 4D:
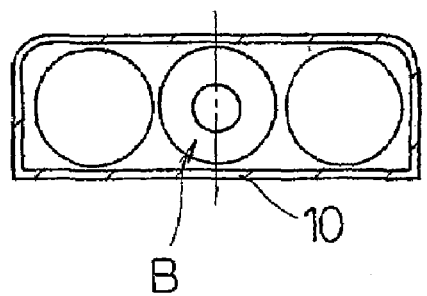
FIG. 4D is a sectional view of the same.
Figure 5:
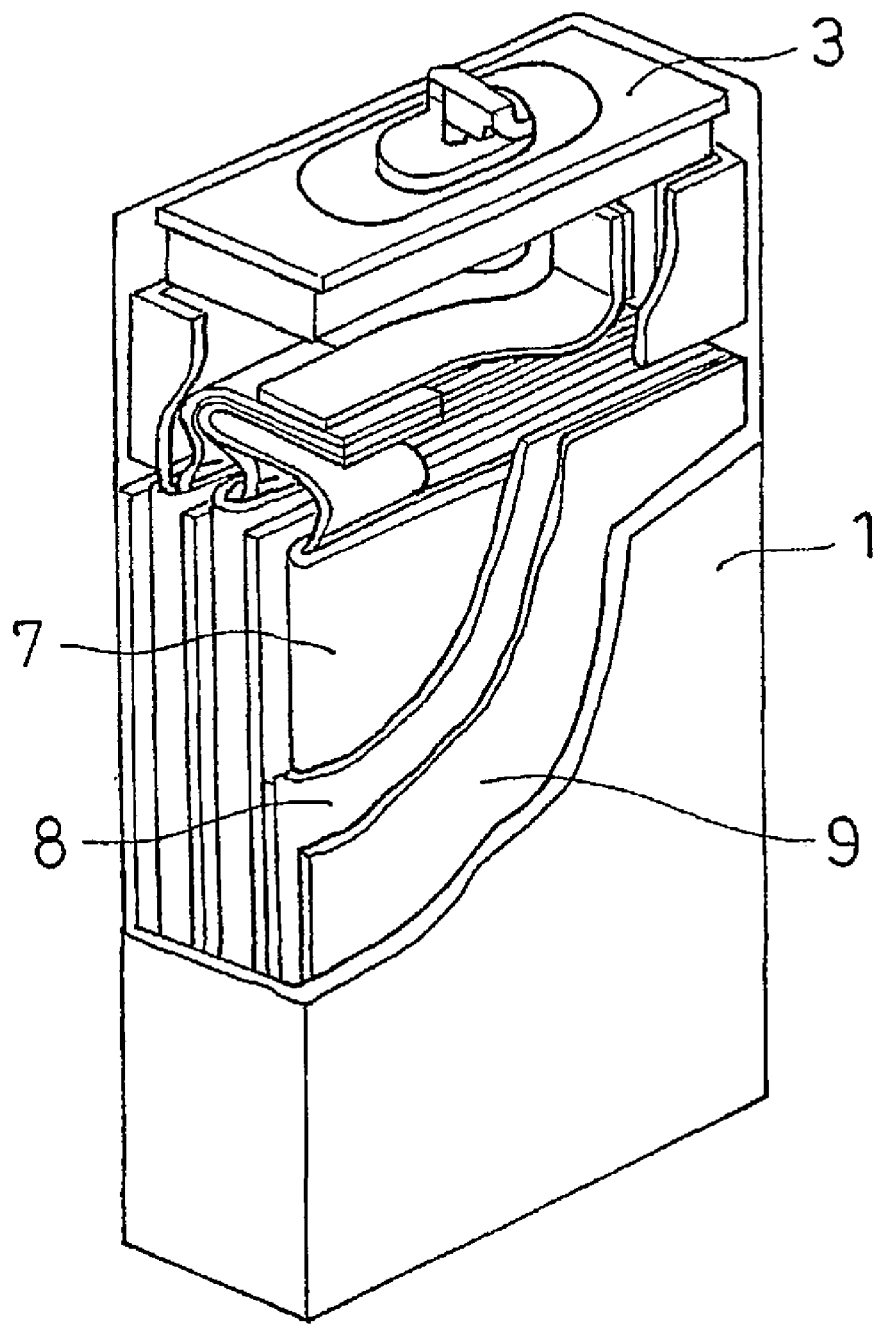
FIG. 5 is a partially cutaway perspective view showing a known prismatic alkaline rechargeable battery.
Figure 6:
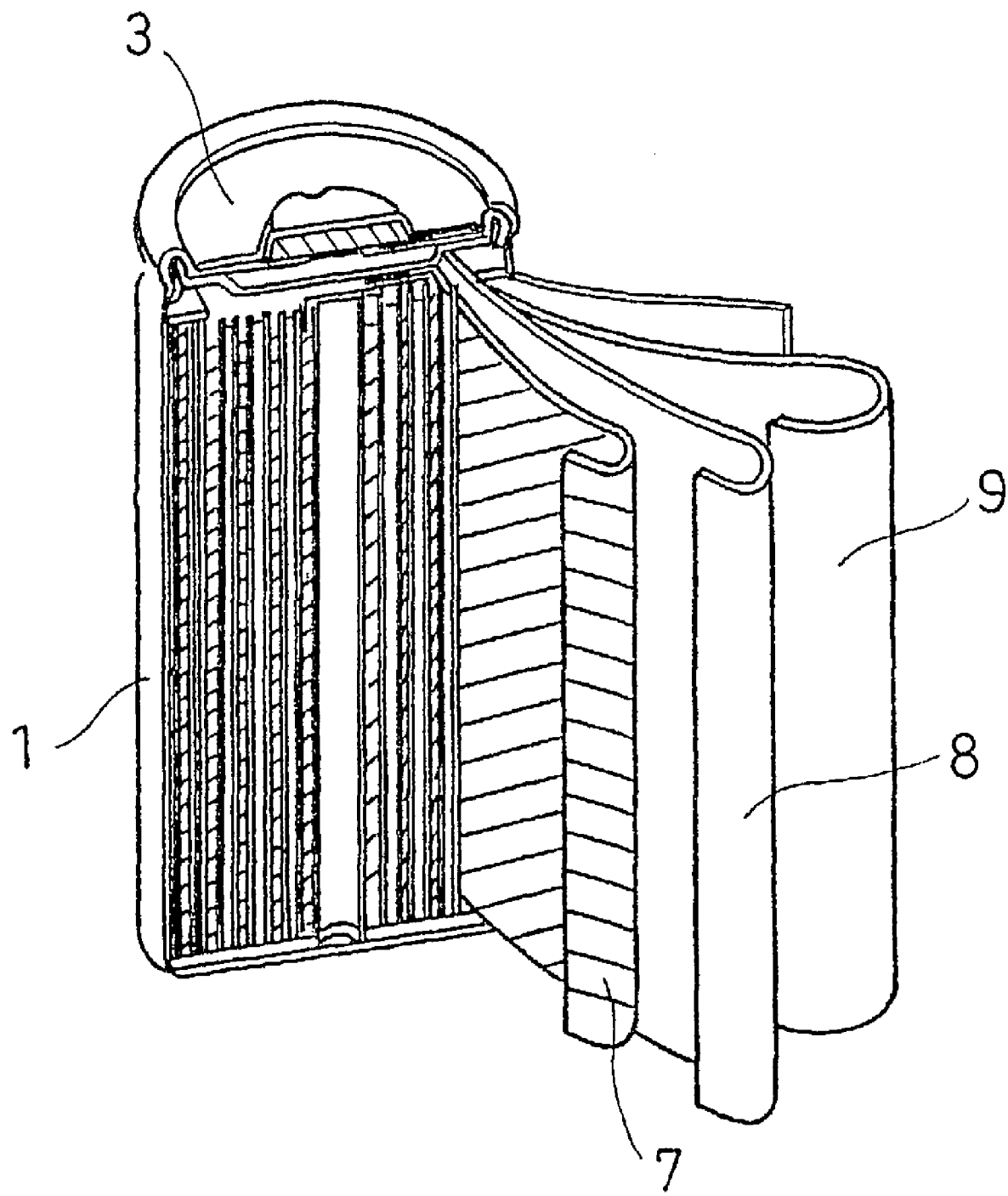
FIG. 6 is a semi diagrammatical, half cross-sectional perspective view showing a known cylindrical alkaline rechargeable battery.

The battery of the present invention employs a cylindrical metal component for the case as described later with reference to FIG. 3, and accordingly the elements for electromotive force are assembled in a similar manner as in the fabrication of cylindrical batteries, which is simply and efficiently carried out. The battery case is sealed by a disk-like sealing plate 3 by caulking as in a known cylindrical battery, so that the battery has excellent sealing property against leakage of electrolyte.

After being assembled, the battery is processed so that its body portion 1b has a square cross section, as shown in FIG. 2C. The length t1 of one side of the cross section of the body portion 1b is equal to or longer than the diameter t2 of the cross section of the head portion 1a. Thus the battery has a substantially prismatic body portion 1b with a cylindrical head portion 1a.

Preferably, the square cross section of the body portion 1b should have slightly rounded corners as shown in FIG. 2C, whereby the battery case has enhanced pressure tightness. The body portion 1b can readily be formed to have such cross section from a cylindrical component.

The battery of the invention is manufactured as follows. In FIG. 3, reference numeral 2 denotes an electrode plate assembly including a strip of positive electrode plate containing nickel hydroxide as an active material, and a strip of negative electrode plate containing hydrogen-absorption alloy powder, these being wound into a roll with a separator arranged therebetween. A current collecting lead wire 4 made of nickel is welded to the upper part of the positive electrode plate. The separator is made of polypropylene having undergone a hydrophilic treatment. The electrode plate assembly 2 is inserted into a cylindrical metal case 1 having a height of 52 mm, and a diameter of 11 mm. The metal case 1 also serves as the negative electrode terminal.

After the electrode plate assembly 2 and an insulating plate 5 provided for preventing short-circuits are housed inside the case 1, the case 1 is subjected to compression molding so as to reduce the diameter of its head portion 1a to about 9.8 mm. The "head portion 1a" of the battery is about 8 mm long upper end portion of the cylindrical case 1 from its open top end edge.

Then, a cylindrical inner mold (not shown) is fitted into the top opening of the case 1, while the case 1 is pushed upwards and rotated, with a rolling mold rotating in a reverse direction of the rotating direction of the case 1 being pressed against the head portion 1a. Thereby, a groove 6 or an annular recess is formed on the side wall of the head portion 1a, so that the electrode plate group 2 is fixedly held inside the case 1.

Subsequently, alkaline electrolyte is injected into the case 1, and the sealing plate 3 and the lead wire 4 are connected to each other by resistance welding. The sealing plate 3 serving as the positive electrode terminal is arranged upon the annular protrusion, which is the reverse side of the groove 6, inside the head portion 1a, and the upper end edge of the case 1 is caulked inwardly, thereby airtightly sealing the battery.

The battery thus obtained then undergoes initial charging and discharging, after which the battery body portion 1b is subjected to compression molding so that it has a square cross section. In this embodiment, the square cross section of the body portion 1b has a 10 mm side length with rounded corners of 3 mm radius of curvature.

FIGS. 4A to 4D are diagrams given for comparison of the efficiency in utilizing the space available in a battery pack case for constituting a battery pack, between the battery according to the invention and a known cylindrical battery having 10 mm diameter.

By way of example, battery A obtained through the above-described process and the conventional cylindrical battery B, each in sets of three, are respectively housed in battery pack cases 10. As best seen from FIG. 4B and FIG. 4D, the battery A efficiently utilizes the space available within the battery pack case having a substantially rectangular cross section, and accordingly has larger capacity than the battery B. The increase in the internal volumetric capacity obviously leads to various advantages in the performance of battery.

The specific embodiment described above is illustrative of the practice of the invention. It is to be understood, therefore, that other expedients known to those skilled in the art or disclosed herein, may be employed without departing from the invention or the scope of the appended claims. For example, the present invention is not limited to battery cases including ends formed with arcuate edges having constant radii of curvature, but could include battery cases with edges having varying radii of curvature or sections having different radii of curvature.

INDUSTRIAL APPLICABILITY

As described above, the present invention enjoys the both merits of the cylindrical battery and the prismatic battery, and provides a reliable and readily producible high capacity battery which can be packaged efficiently within confined spaces.

The invention claimed is:

1. A method for manufacturing a battery, said battery comprising:
   a prismatic metal case formed from a cylindrical metal case, said cylindrical case forming a negative terminal and having an open top end with a predetermined interior diameter;
   a sealing plate forming a lid and sealing the open end of the case, said sealing plate being radially centered in said case;
   said sealing plate being a positive terminal and including an axially extending exterior cylindrical wall with an exterior diameter that is smaller than the interior diameter of said case;
   said sealing plate further including a radially centered and axially extending protrusion; and
   said battery further comprising a cylindrically rolled electrode plate assembly disposed in the case;
   said method comprising the steps of:
   disposing the electrode plate assembly in said open top of said cylindrical case prior to applying said sealing plate;
   reducing the interior diameter of the open top end portion of the cylindrical case so as to coincide with the exterior diameter of said sealing plate;
   forming a radially inward protruding edge in said top end portion of said cylindrical case, said protruding edge having an internal diameter that is smaller than the external diameter of said sealing plate for supporting an axially bottom edge of said sealing plate;
   sealing the open end of the cylindrical case with the sealing plate by bending said top end portion of said case over an axially top edge of said exterior cylindrical wall of said sealing plate; and
   processing the cylindrical case by compression molding so as to have a body portion having a substantially square cross section.

2. The method for manufacturing a battery according to claim 1, wherein one side of the square cross section of the body portion of the cylindrical case has a length equal to or larger than the diameter of the top end portion of the cylindrical case.

3. The method for manufacturing a battery according to claim 1 or 2, wherein the square cross section of the body portion of the cylindrical case has rounded corners.

4. The method for manufacturing a battery according to claim 1 or 2, wherein the sealing plate has a shape of a disc, and the open end of the metal case is sealed with the sealing plate by caulking.

5. The method for manufacturing a battery according to claim 1 or 2, wherein the electrode plate assembly includes a strip of positive electrode plate and a strip of negative electrode plate laminated and wound into a roll with a strip of intervening separator therebetween.

6. The method for manufacturing a battery according to claim 1 or 2, wherein the battery is an alkaline rechargeable battery or a lithium-based rechargeable battery.

* * * * *